US009156922B2

(12) United States Patent
Willocq et al.

(10) Patent No.: US 9,156,922 B2
(45) Date of Patent: Oct. 13, 2015

(54) MODIFIED CATALYST SUPPORTS

(75) Inventors: Christopher Willocq, Bousval (BE); Martine Slawinski, Nivelles (BE); Aurélien Vantomme, Bois-d'Haine (BE)

(73) Assignee: TOTAL RESEARCH & TECHNOLOGY FELUY, Seneffe (Feluy) (BE)

( * ) Notice: Subject to any disclaimer, the term of this patent is extended or adjusted under 35 U.S.C. 154(b) by 241 days.

(21) Appl. No.: 13/581,813

(22) PCT Filed: Mar. 3, 2011

(86) PCT No.: PCT/EP2011/053233
§ 371 (c)(1),
(2), (4) Date: Oct. 15, 2012

(87) PCT Pub. No.: WO2011/107560
PCT Pub. Date: Sep. 9, 2011

(65) Prior Publication Data
US 2013/0144016 A1    Jun. 6, 2013

(30) Foreign Application Priority Data

Mar. 4, 2010  (EP) .................................... 10155537
Aug. 12, 2010 (EP) .................................... 10172638

(51) Int. Cl.
*C08F 4/02*     (2006.01)
*C08F 4/6392*   (2006.01)
(Continued)

(52) U.S. Cl.
CPC ............. *C08F 4/025* (2013.01); *C08F 4/63922* (2013.01); *C08F 10/00* (2013.01); *C08F 4/65927* (2013.01); *C08F 110/06* (2013.01); *C08F 210/06* (2013.01); *C08F 210/16* (2013.01)

(58) Field of Classification Search
None
See application file for complete search history.

(56) References Cited

U.S. PATENT DOCUMENTS 5,124,418 A  *  6/1992  Welborn, Jr. .................. 526/114
5,310,716 A       5/1994  Luciano et al.
(Continued)

FOREIGN PATENT DOCUMENTS

EP    0882743 A1    12/1998
GB    1415649 A     11/1975
(Continued)

OTHER PUBLICATIONS

English language translation of Abstract of JP 08-059722.*
(Continued)

*Primary Examiner* — Ling Choi
*Assistant Examiner* — Catherine S Branch

(57) ABSTRACT

A process for preparing a supported catalyst system comprising the following steps:
  a. titanating a silica-containing catalyst support having a specific surface area of from 150 $m^2/g$ to 800 $m^2/g$, preferably 280 to 600 $m^2/g$, with at least one vaporized titanium compound of the general formula selected from $R_nTi(OR')_m$ and $(RO)_nTi(OR')_m$, wherein R and R' are the same or different and are selected from hydrocarbyl groups containing from 1 to 12 carbon and halogens, and wherein n is 0 to 4, m is 0 to 4 and m+n equals 4, to form a titanated silica-containing catalyst support having at least 0.1 wt % of Ti based on the weight of the titanated silica-containing catalyst support,
  b. treating the support with a catalyst activating agent, preferably an alumoxane.
  c. treating the titanated support with at least one metallocene during or after step (b).

18 Claims, 5 Drawing Sheets

(51) Int. Cl.
*C08F 10/00* (2006.01)
*C08F 4/6592* (2006.01)
*C08F 110/06* (2006.01)
*C08F 210/06* (2006.01)
*C08F 210/16* (2006.01)

(56) References Cited

U.S. PATENT DOCUMENTS

| | | | |
|---|---|---|---|
| 6,642,325 B2 * | 11/2003 | Luo et al. | 526/129 |
| 7,381,778 B2 * | 6/2008 | Katzen et al. | 526/104 |
| 2007/0142577 A1 | 6/2007 | Katzen et al. | |
| 2008/0009407 A1 | 1/2008 | Bodart et al. | |
| 2009/0258995 A1 * | 10/2009 | Shannon et al. | 525/240 |

FOREIGN PATENT DOCUMENTS

| | | | |
|---|---|---|---|
| JP | 08059722 A | * | 3/1996 |
| WO | 96/34895 A1 | | 11/1996 |
| WO | 2012001160 A2 | | 1/2012 |

OTHER PUBLICATIONS

Conway et al., "Chromia/Silica-Titania Cogel Catalysts for Ethene Polymerisation," J. Chem. Soc. Faraday Trans. 1, 1989, 71-78. 85(1).*

Bunjerd Jongsomjit, et al.; Role of Titania in TiO2—SiO2 Mixed Oxides-Supported Metallocene Catalyst During Ethylene/1-Octene Copolymerization; Catalysis Letters, vol. 100, Nos. 3-4; Apr. 2005; pp. 139-146; DOI: 10.1007/s10562-004-3445-6; XP19276109A.

Steven J. Conway, et al.; "Chromia/Silica-Titania Cogel Catalysts for Ethylene Polymerisation"; Polymerixation Kinetics; J. Chem. Soc., Faraday Trans. J., vol. 85, No. 1; 1989; pp. 71-78.

Bunjerd Jongsomjit, et al.; "Application of Silica/Titania Mixed Oxide-Supported Zirconocene Catalyst for Synthesis of Linear Low-Density Polyethylene"; Ind. Eng. Chem. Res., American Chemical Society, US, vol. 44, No. 24; Jan. 1, 2005; pp. 9059-9063; XP007913486; ISSN: 0888-5885; DOI: DOI:10.1021/IE050806D.

Office Action issued in European Patent Application No. 11706596. 1-1301 dated Aug. 27, 2013 (12 pages).

Jongsomjit et al., "Catalytic Activity During Copolymerization of Ethylene and 1-Hexene via Mixed TiO2/SiO2- Supported MAO with rac-Et[Ind]2ZrCl2 Metallocene Catalyst", Molecules 2005, 10, 672-678.

* cited by examiner

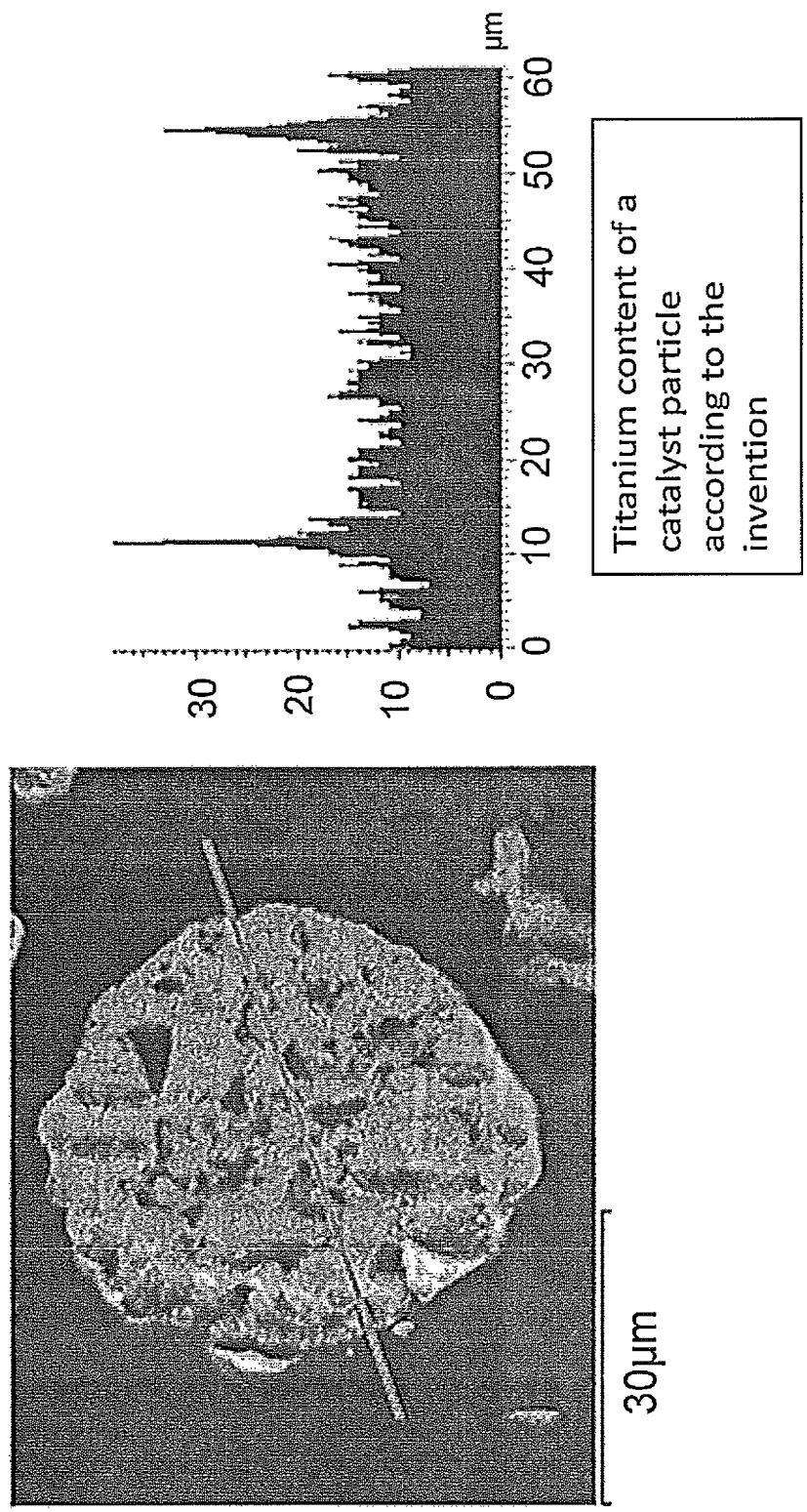
Fig. 5: Titanium content

MODIFIED CATALYST SUPPORTS

CROSS-REFERENCE TO RELATED APPLICATIONS

This application claims the benefit of PCT/EP2011/053233, filed Mar. 3, 2011, which claims priority from EP 10155573.3, filed Mar. 4, 2010 and EP 10172638.8, filed Aug. 12, 2010.

FIELD OF THE INVENTION

The invention relates to a process for preparing modified catalyst supports, in particular catalyst supports suitable for metallocene catalyst systems.

The invention also relates to the supported catalyst system obtained according to this process, the olefin polymerisation process using such a support and the polyolefin obtained thereby.

BACKGROUND OF THE INVENTION

Metallocene catalyst systems are extensively used in a variety of polymerisation systems, including the polymerisation of olefins. Generally, in order to obtain the highest activity from metallocene catalysts, it has been necessary to use them with an organoaluminoxane activating agent, such as methylaluminoxane (MAO). This resulting catalyst system is generally referred to as a homogenous catalyst system since at least part of the metallocene or the organoaluminoxane is in solution in the polymerisation media. These homogenous catalyst systems have the disadvantage that when they are used under slurry polymerisation conditions, they produce polymers which stick to the reactor walls during the polymerisation process (generally referred to as "fouling") and/or polymers having small particle size and low bulk density which limit their commercial utility.

Various methods have been proposed in an effort to overcome the disadvantages of the homogenous metallocene catalyst systems. Typically, these procedures have involved the prepolymerisation of the metallocene aluminoxane catalyst system and/or supporting the catalyst system components on a porous carrier (also known as a "particulate solid" or "support"). The porous carrier is usually a silica-containing support. Another important consideration in the development of metallocene catalysts is the yield of solid polymer that is obtained by employing a given quantity of catalyst in a given amount of time. This is known as the "activity" of the catalyst. There is an ongoing search for metallocene catalysts and techniques for preparing such catalysts which give improved activity for the polymerisation of olefins. An improved activity means that less catalyst needs to be used to polymerise more olefins, thereby reducing the costs considerably, since metallocenes are more expensive than Ziegler-Natta and chromium catalysts.

Several attempts have been made to titanate silica supports for use in metallocene catalysed ethylene polymerisations. Jongsomjit et al. (Molecules 2005, 10, 672, Ind. Eng. Chem. Res. 2005, 44, 9059 and Catalysis Letters Vol. 100, Nos. 3-4, April 2005) discloses the titanation of silicas for zirconocene catalysed ethylene polymerisation, wherein the support is allegedly prepared according to Conway et al. (J. Chem. Soc., Faraday Trans. J, 1989, 85(1), 71-78), such that (without being bound to theory) the titania is mixed throughout the catalyst support. Without being bound to theory it is thought that the activity is limited, because the catalyst grains are not rendered fragile enough to burst during polymerisation and free up active sites. In addition, the interaction of the Ti with the actives sites is not optimized. Moreover, the interaction of the MAO with the TiOH and/or SIOH is different.

EP 0882 743 discloses a titanation procedure wherein the titanium compound is pumped as a liquid into the reaction zone where it vaporises to titanate a supported chromium-based catalyst. This procedure is strictly applicable to chromium catalysts (Philipp's type catalysts) i.e. only supported chromium catalysts are titanated in this way in order to obtain shorter polymer chains during polymerisation of olefins. There is no incentive to titanate a support (which does not contain any chromium) in the same way for use in metallocene catalysed olefin polymerisations with the hope of increasing the catalyst system's activity. Chromium catalysts are an entirely different class of catalyst from metallocenes, the latter being single-site and much more sensitive to poisons. They undergo such completely different reaction mechanisms that polyolefins prepared with chromium catalysts and metallocene catalysts have very different molecular structures, notably metallocenes provide polyolefins with narrower molecular weight distributions. In addition, chromium catalysts after being titanated require severe activation conditions, e.g. activation temperatures of at least 700° C., so that the titanium compounds ignite to yield at least partially $TiO_2$.

Thus, a catalyst support is needed for metallocene catalysts with improved activity, without requiring severe activation conditions or long residence times.

An object of the present invention is to provide a new improved silica-containing catalyst support for metallocenes.

It is a further object of the present invention to provide supported metallocene catalyst systems having a higher catalytic activity.

Furthermore, it is an object of the present invention to obtain polyolefins with a lower catalytic residue.

SUMMARY OF THE INVENTION

At least one of the objects is solved by the present invention.

The invention covers a process for preparing a supported catalyst system comprising the following steps, preferably in the order given:

a. titanating a silica-containing catalyst support having a specific surface area of from 150 $m^2/g$ to 800 $m^2/g$, preferably 280 to 600 $m^2/g$, more preferably 280 $m^2/g$ to 400 $m^2/g$, preferably in an atmosphere of dry and inert gas and/or air, preferably at at least 220° C., with at least one vapourised titanium compound of the general formula selected from $R_nTi(OR')_m$ and $(RO)_nTi(OR')_m$, wherein R and R' are the same or different and are selected from hydrocarbyl groups containing from 1 to 12 carbon and halogens, and wherein n is 0 to 4, m is 0 to 4 and m+n equals 4, to form a titanated silica-containing catalyst support having at least 0.1 wt % of Ti based on the weight of the titanated silica-containing catalyst support b. treating the titanated support with a catalyst activating agent, preferably an alumoxane.

c. treating the titanated support with a metallocene during or after step (b).

The supported catalyst system obtainable according to the process of the invention (in particular according to the process of claims 1 to 7 below) is also covered. It should be noted that the supported catalyst system obtained according to this method has titanium deposited on the surface of the silica-containing support (see FIG. 5). Furthermore, it was observed that the catalyst support particles have a surprisingly improved morphology, particularly when comprising from 0.1 to 12 wt % of Ti based on the weight of the titanated silica-containing catalyst support.

In another embodiment a supported metallocene catalyst system is provided having a Ti content of 0.1 to 12 wt % based on the weight of the titanated silica-containing catalyst support, an atomic molar ratio of Ti to the transition metal M, selected from zirconium, hafnium and vanadium, (Ti/M) of 0.13 to 500 and preferably an atomic molar ratio of Cl to Ti (Cl/Ti) of less than 2.5. In a more preferred embodiment the supported metallocene catalyst system has a Ti content of 0.1 to 10 wt % based on the weight of the titanated silica-containing catalyst support, an atomic molar ratio Ti/M of 1.3 to 420 and preferably an atomic molar ratio Cl/Ti of less than 2.5.

There is also provided a process for preparing a polyethylene comprising the step of polymerising olefins, preferably ethylene or propylene, in the presence of a supported catalyst system according to the invention, either in the gas phase or in the slurry phase or solely in the case of propylene polymerisation, in bulk. Optionally the olefin is copolymerised with one or more alpha-olefin comonomers.

The polyolefin obtainable using the supported catalyst system obtainable according to the invention is covered by the invention as well.

In another embodiment, a polyolefin is provided having an atomic molar ratio of Ti/M, wherein M is selected from zirconium, hafnium and vanadium, of 0.13 to 500, preferably 1.3 to 420, and preferably an atomic molar ratio of Cl/Ti of less than 2.5.

Surprisingly the catalyst support according to the invention improves the activity of the metallocene deposited thereon. It is thought, without being bound to theory that the titanation step according to the invention, causes the titanium compound to be present predominantly on the surface of the support, thereby rendering the catalyst grains more fragile, and allowing the silica-containing support to break and/or burst during polymerisation to provide even more accessible active sites. Furthermore, the distribution of the MAO and it's interaction with TiOH and SiOH is optimized. The electronic effect of the specific Ti distribution on the catalyst grain surface increases the catalyst system's activity. The increase in activity, means less catalytic residue remains in the final polyolefin product and the content of volatiles is reduced, which are both particularly interesting features from a health and safety point of view.

BRIEF DESCRIPTION OF THE DRAWINGS

FIG. 5 represents a SEM of the titanated supported catalyst system, showing the higher concentration of Ti on the surface of the particles.

DETAILED DESCRIPTION OF THE INVENTION

Catalyst System

Figure 1:
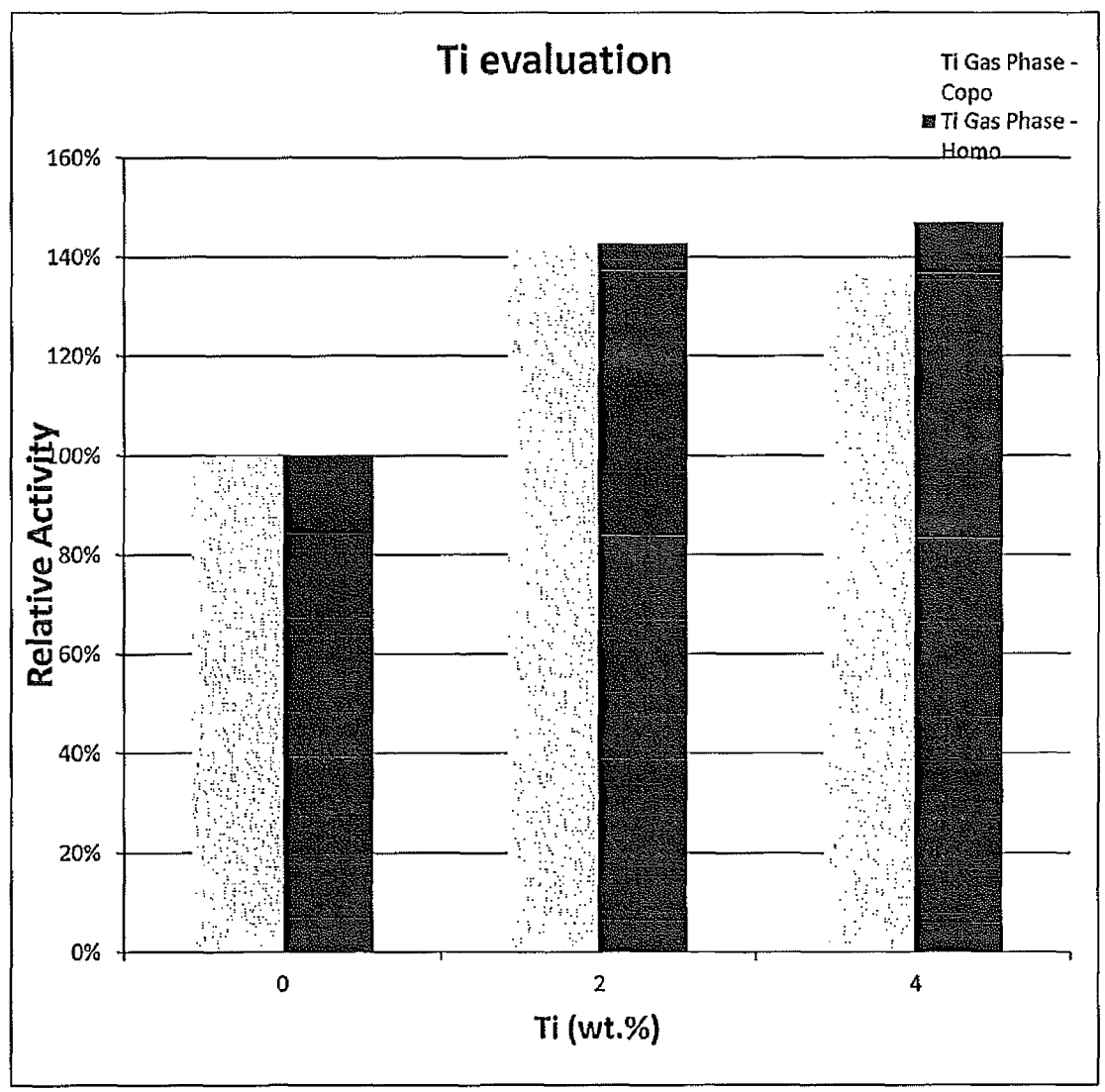
FIG. 1 represents a comparison of the catalytic activities of the metallocene catalyst system comprising different weight percentages of Ti added according to the invention with the catalytic activity of the metallocene catalyst system without titanium for ethylene homo and copolymerisations.

The present invention relates to a process for preparing a silica-containing catalyst support, for preparing the catalyst system prepared with said support and for the production of polyolefins with said catalyst system. The support according to the invention is particularly suitable for metallocene catalyst polymerisations, since it increases the activity of the metallocene catalyst system considerably.

Suitable supports used in this invention are silica-based and comprise amorphous silica having a surface area of at least 150 $m^2/g$, preferably of at least 200 $m^2/g$, more preferably of at least 280 $m^2/g$, and at most 800 $m^2/g$, preferably to at most 600 $m^2/g$, more preferably to at most 400 $m^2/g$ and more preferably to at most 380 $m^2/g$. The specific surface area is measured by $N_2$ adsorption using the well-known BET technique.

Silica-containing supports contain at least 20, 40, or 50% by weight of amorphous silica. The silica-containing support may also contain one or more of alumina, magnesia, titania, zirconia and the like.

Preferably the support is a silica support i.e. essentially 100% by weight of silica, or a silica-alumina support. In the case of silica-alumina supports, the support preferably comprises at most 15% by weight of alumina.

In general, the supports advantageously have a pore volume of 1 $cm^3/g$ to 3 $cm^3/g$. Supports with a pore volume of 1.3-2.0 $cm^3/g$ are preferred. Pore volume is measured by $N_2$ desorption using the BJH method for pores with a diameter of less than 1000 Å. Supports with too small a porosity may result in a loss of melt index potential and in lower activity. Supports with a pore volume of over 2.5 $cm^3/g$ are less desirable because they may require special expensive preparation steps (e.g. azeotropic drying) during their synthesis. In addition, because they are usually more sensitive to attrition during catalyst handling, activation or use in polymerisation, these supports often lead to more polymer fines production, which is detrimental in an industrial process.

The silica-containing support can be prepared by various known techniques such as but not limited to gelification, precipitation and/or spray-drying. Usually, the particle size D50 is from 5 µm, preferably from 30 µm and more preferably from 35 µm, up to 150 µm, preferably up to 100 µm and most preferably up to 70 µm. D50 is defined as the particle diameter, where 50 wt-% of particles have a smaller diameter and 50 wt-% of particles have a larger diameter. Particle size D90 is up to 200 µm, preferably up to 150 µm, most preferably up to 110 µm. D90 is defined as the particle diameter where 90 wt-% of particles have a smaller diameter and 10 wt-% of particles have a larger diameter. Particle size D10 is at least 2 µm, preferably at least 5 µm. D10 is defined as the particle diameter where 10 wt-% of particles have a smaller diameter and 90 wt-% of particles have a larger diameter. Particle size distribution is determined using light diffraction granulometry, for example, using the Malvern Mastersizer 2000. The particle morphology is preferably microspheroidal to favour fluidisation and to reduce attrition.

The silica-containing support is dried before and/or during and/or after titanation. If dried before, the support can be subjected to a pre-treatment in order to dehydrate it and drive off physically adsorbed water. The dehydration step is preferably carried out by heating the catalyst to a temperature of at least 100° C., more preferably of at least 250° C. and most preferably of at least 270° C. The drying can take place in an atmosphere of dry and inert gas and/or air, but preferably in an atmosphere of dry and inert gas e.g. nitrogen. The drying may be carried out in a fluidised bed and in an atmosphere of a dry and inert gas, for example, nitrogen. Such a dehydration step can be usually carried out for 0.5 to 6 hours. This step generally lasts for at least 1 hour, more preferably at least 2 hours, most preferably at least 4 hours.

The support can also be dried/heated after titanation, preferably to a temperature of from 350° C. to 800° C., more preferably 400° C. to 700° C., most preferably around 450° C.

The silica-containing support is loaded with one or more titanium compounds after or during drying. Since the aim is to provide a catalyst support suitable for metallocene catalysts, the titanation step does not require the presence of chromium (the presence of chromium would imply that a chromium catalyst is being envisaged, which is not the case here). The titanium compounds may be of the formula $R_n Ti(OR')_m$, $(RO)_n Ti(OR')_m$ and mixtures thereof, wherein R and R' are the same or different hydrocarbyl groups containing 1 to 12 carbon atoms or halogen selected preferably from chlorine or fluorine, and wherein m and n is equal to 0, 1, 2, 3 or 4 and m+n equals 4. However, preferably, the Cl/Ti atomic molar ratio remains below 2.5. Preferably, the titanium compounds are titanium tetraalkoxides $Ti(OR')_4$ wherein each R' is the same or different and can be an alkyl or cycloalkyl group each having from 3 to 5 carbon atoms. Mixtures of these compounds can also be used. Preferably, the titanium compounds are selected from $Ti(OC_4H_9)_4$ and $Ti(OC_3H_7)_4$, preferably a mixture of both, more preferably a mixture having a weight ratio of 20:80 of $Ti(OC_4H_9)_4$ to $Ti(OC_3H_7)_4$. The titanation is preferably performed by progressively introducing the titanium compound into a stream of a dry and inert non-oxidizing gas, for example, nitrogen, and/or air. More preferably, the titanation is performed in a stream of a dry and inert gas. The titanation step is carried out at a temperature so that titanium compound is present in its vaporised form. The temperature is maintained preferably at at least 220° C., more preferably at at least 250° C. and most preferably at at least 270° C. The titanium compound can be pumped as a liquid into the reaction zone where it vaporizes.

This titanation step is controlled so that the total amount of deposited titanium is from 0.1 wt % up to 60 wt % based on the weight of the titanated silica-containing catalyst support, preferably from 0.1 wt % to 25 wt %, more preferably from 0.5 wt % to 15 wt %, even more preferably from 1 wt % to 12 wt % and most preferably from 1 wt % to 10 wt %. The total amount of titanium compound introduced into the gas stream is calculated in order to obtain the required titanium content in the resultant catalyst support and the progressive flow rate of the titanium compound is adjusted in order to provide a titanation reaction period of 0.5 to 2 hours.

Preferably, the titanation step is controlled so that the ratio of the specific surface area of the support to titanium content of the resultant catalyst support is from 5000 to 20000 m²/g Ti, and more preferably from 5000, 6500, 7500 or 9000 m²/g Ti, up to 12000, 15000 or 20000 m²/g Ti. In a preferred embodiment, if the support has a specific surface area of from at least 250 m²/g and of less than 380 m²/g, the ratio of specific surface area of the support to titanium content of the titanated support ranges from 5000 to 20000 m²/g Ti, and if the support has specific surface area of from at least 380 and of less than 400 m²/g, the ratio of specific surface area of the support to titanium content of the titanated catalyst support ranges from 5000 to 8000 m²/g Ti.

After the introduction of the titanium compound, the catalyst support can be flushed under a gas stream for a period of typically 0.75 to 2 hours. The dehydration and titanation steps are preferably performed in the vapour phase in a fluidised bed.

Thereafter, the support is preferably heated to a temperature of 350° C. to 800° C., more preferably 400° C. to 700° C., most preferably around 450° C. This step generally lasts for at least 1 hour, more preferably at least 2 hours, most preferably at least 4 hours.

After titanation the titanated catalyst support can be stored under a dry and inert atmosphere, for example, nitrogen, at ambient temperature.

The catalyst support is treated with a catalyst activating agent after titanation. In a preferred embodiment, alumoxane or a mixture of alumoxanes are used as an activating agent for the metallocene, but any other activating agent known in the art can be used e.g. borane compounds. The alumoxane can be used in conjunction with the metallocene in order to improve the activity of the catalyst system during the polymerisation reaction. As used herein, the term alumoxane is used interchangeably with aluminoxane and refers to a substance, which is capable of activating the metallocene.

Alumoxanes used in accordance with the present invention comprise oligomeric linear and/or cyclic alkyl alumoxanes. In an embodiment, the invention provides a process wherein said alumoxane has formula (III) or (IV)

R—(Al(R)—O)$_x$—AlR$_2$ (III) for oligomeric, linear alumoxanes; or (—Al(R)—O—)$_y$(IV) for oligomeric, cyclic alumoxanes wherein x is 1-40, and preferably 10-20;
wherein y is 3-40, and preferably 3-20; and
wherein each R is independently selected from a $C_1$-$C_8$ alkyl, and preferably is methyl.

In a preferred embodiment, the alumoxane is methylalumoxane (MAO). Generally, in the preparation of alumoxanes from, for example, aluminum trimethyl and water, a mixture of linear and cyclic compounds is obtained. Methods for manufacturing alumoxane are known in the art and will therefore not be disclosed in detail herein.

The treatment of the catalyst support with the alumoxane can be carried out according to any known method known by the person skilled in the art. Advantageously, the alumoxane, preferably MAO, is mixed in an inert diluent/solvent, preferably toluene, with the catalyst support. Alumoxane deposition preferably occurs at a temperature between 60° C. to 120° C., more preferably 80° C. to 120° C., most preferably 100 to 120° C.

The catalyst support is treated with a metallocene either during treatment with the catalyst activating agent (1-pot method) or thereafter. Any metallocene known in the art can be applied, including a mixture of different metallocenes. As used herein, the term "metallocene" refers to a transition metal complex with a coordinated structure, consisting of a metal atom bonded to one or more ligands. The metallocene are used according to the invention is preferably chosen from formula (I) or (II):

$(Ar)_2MQ_2$ (I); or $R''(Ar)_2MQ_2$ (II)

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of hydrogen, halogen and a hydrocarbyl having 1 to 20 carbon atoms and wherein said hydrocarbyl optionally contains one or more atoms selected from the group comprising B, Si, S, O, F and P;

wherein M is a transition metal M selected from the group consisting of titanium, zirconium, hafnium and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F and P; and wherein R" is a divalent group or moiety bridging the two Ar groups and selected from the group consisting of a $C_1$-$C_{20}$ alkylene, a germanium, a silicon, a siloxane, an alkylphosphine and an amine, and wherein said R" is optionally substituted with one or more substituents each independently selected from the group comprising a hydrocarbyl having 1 to 20 carbon atoms and wherein said hydrocarbyl optionally contains one or more atoms selected from the group comprising B, Si, S, O, F and P.

The term "hydrocarbyl having 1 to 20 carbon atoms" as used herein is intended to refer to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof.

Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl.

Exemplary halogen atoms include chlorine, bromine, fluorine and iodine and of these halogen atoms, chlorine is preferred.

Exemplary hydrocarboxy groups are methoxy, ethoxy, propoxy, butoxy, and amyloxy.

In accordance with the present invention, a process is provided wherein ethylene monomer is polymerised in the presence of a bridged or non-bridged metallocene. "Bridged metallocenes" as used herein, are metallocenes in which the two aromatic transition metal ligands, denoted as Ar in formula (I) and (II) are covalently linked or connected by means of a structural bridge. Such a structural bridge, denoted as R" in formula (I) and (II) imparts stereorigidity on the metallocene, i.e. the free movement of the metal ligands is restricted. According to the invention, the bridged metallocene consists of a meso or racemic stereoisomer.

The two Ar can be the same or different. In a preferred embodiment the two Ar are both indenyl or both tetrahydroindenyl wherein each of said groups may be optionally substituted with one or more substituents each independently selected from the group consisting of hydrogen, halogen and a hydrocarbyl having 1 to 20 carbon atoms and wherein said hydrocarbyl optionally contains one or more atoms selected from the group comprising B, Si, S, O, F and P. If substituted, both Ar are preferably identically substituted. However, in a preferred embodiment, both Ar are unsubstituted.

In a preferred embodiment, the metallocene used in a process according to the invention is represented by formula (I) or (II) as given above, wherein Ar is as defined above, and wherein both Ar are the same and are selected from the group consisting of cyclopentadienyl, indenyl, tetrahydroindenyl and fluorenyl, wherein each of said groups may be optionally substituted with one or more substituents each independently selected from the group consisting of halogen and a hydrocarbyl having 1 to 20 carbon atoms as defined herein;

wherein M is as defined above, and preferably is zirconium, wherein Q is as defined above, and preferably both Q are the same and are selected from the group consisting of chloride, fluoride and methyl, and preferably are chloride; and wherein R" when present, is as defined above and preferably is selected from the group consisting of a $C_1$-$C_{20}$ alkylene, and a silicon, and wherein said R" is optionally substituted with one or more substituents each independently selected from the group comprising a halogen, hydrosilyl, hydrocarbyl having 1 to 20 carbon atoms as defined herein.

In another preferred embodiment, the metallocene used in a process according to the invention is represented by formula (I) or (II) as given above, wherein Ar is as defined above, and wherein both Ar are different and are selected from the group consisting of cyclopentadienyl, indenyl, tetrahydroindenyl and fluorenyl, wherein each of said groups may be optionally substituted with one or more substituents each independently selected from the group consisting of, halogen and a hydrocarbyl having 1 to 20 carbon atoms as defined herein;

wherein M is as defined above, and preferably is zirconium, wherein Q is as defined above, and preferably both Q are the same and are selected from the group consisting of chloride, fluoride and methyl, and preferably are chloride; and wherein R" when present is as defined above and preferably is selected from the group consisting of a $C_1$-$C_{20}$ alkylene, and a silicon, and wherein said R" is optionally substituted with one or more substituents each independently selected from the group comprising a hydrocarbyl having 1 to 20 carbon atoms as defined herein.

In an embodiment, the invention provides a process wherein said metallocene is an unbridged metallocene.

In a preferred embodiment, the invention provides a process wherein said metallocene is an unbridged metallocene selected from the group comprising bis(iso-butylcyclopentadienyl) zirconium dichloride, bis(pentamethylcyclopentadienyl)zirconium dichloride, bis(tetrahydroindenyl)zirconium dichloride, bis(indenyl)zirconium dichloride, bis(1,3-dimethylcyclopentadienyl)zirconium dichloride, bis(methylcyclopentadienyl) zirconium dichloride, bis(n-butylcyclopentadienyl)zirconium dichloride, and bis(cyclopentadienyl) zirconium dichloride; and preferably selected from the group comprising bis(cyclopentadienyl)zirconium dichloride, bis(tetrahydroindenyl)zirconium dichloride, bis(indenyl)zirconium dichloride, and bis(1-methyl-3-butyl-cyclopentadienyl)zirconium dichloride.

In another embodiment, the invention provides a process wherein said metallocene is a bridged metallocene.

In a preferred embodiment, the invention provides a process wherein said metallocene is a bridged metallocene selected from the group comprising ethylene bis(4,5,6,7-tetrahydro-1-indenyl)zirconium dichloride, ethylene bis(1-indenyl)zirconium dichloride, dimethylsilylene bis(2-methyl-4-phenyl-inden-1-yl)zirconium dichloride, dimethylsilylene bis(2-methyl-1H-cyclopenta[a]naphthalen-3-yl)zirconium dichloride, cyclohexylmethylsilylene bis[4-(4-tert-butylphenyl)-2-methyl-inden-1-yl]zirconium dichloride, dimethylsilylene bis[4-(4-tert-butylphenyl)-2-(cyclohexylmethyl)inden-1-yl]zirconium dichloride. Ethylene bis(4,5,6,7-tetrahydro-1-indenyl)zirconium dichloride is particularly preferred.

In another preferred embodiment, the invention provides a process wherein said metallocene is a bridged metallocene selected from the group comprising diphenylmethylene (3-t-butyl-5-methyl-cyclopentadienyl) (4,6-di-t-butyl-fluorenyl) zirconium dichloride, di-p-chlorophenylmethylene (3-t-butyl-5-methyl-cyclopentadienyl) (4,6-di-t-butyl-fluorenyl)zirconium dichloride, diphenylmethylene (cyclopentadienyl) (fluoren-9-yl)zirconium dichloride, dimethylmethylene (cyclopentadienyl)(2,7-ditert-butyl-fluoren-9-yl)zirconium dichloride, dimethylmethylene[1-(4-tert-butyl-2-methyl-cyclopentadienyl)](fluoren-9-yl)zirconium dichloride, diphenylmethylene[1-(4-tert-butyl-2-methyl-cyclopentadienyp] (2,7-ditert-butyl-fluoren-9-yl)zirconium dichloride, dimethylmethylene[1-(4-tert-butyl-2-methyl-cyclopentadienyl)](3,6-ditert-butyl-fluoren-9-yl)zirconium dichloride dimethylmethylene (cyclopentadienyl)(fluoren-9-yl)zirconium dichloride and dibenzylmethylene(2,7-diphenyl-3,6-di-tert-butyl-fluoren-9-yl)(cyclopentadienyl)zirconium dichloride.

The support is treated with the metallocene, advantageously by mixing the desired metallocene(s) with the MAO-modified support. Preferably mixing occurs at room temperature for a duration of at least 15 min, preferably at least 1 hour, more preferably at least 2 hours.

In a particular embodiment, the invention provides a process wherein the molar ratio of aluminum, provided by the alumoxane, to transition metal M, provided by the metallocene, of the polymerisation catalyst is between 20 and 200, and for instance between 30 and 150, or preferably between 30 and 100.

When the catalyst system has from 0.1 to 12 wt % of Ti based on the weight of the titanated silica-containing catalyst support, the atomic molar ratio of Ti to the transition metal M (Ti/M), wherein M is a transition metal selected from zirconium, hafnium and vanadium, of the supported catalyst system is of 0.13 to 500 and the atomic molar Cl/Ti ratio is preferably less than 2.5. When the catalyst system of the invention has a preferred Ti content of 1 to 10 wt % based on the weight of the titanated silica-containing catalyst support, the Ti/M atomic molar ratio of the supported catalyst system is of 1.3 to 420.

The content of Cl, Ti and M are measured by X-ray fluorescence (XRF) as is known in the art.

The details and embodiments mentioned above in connection with the process for manufacturing the supported catalyst system also apply with respect to supported catalyst system itself.

Polymerisation

The details and embodiments mentioned above in connection with the process for manufacturing the catalyst support and the supported catalyst system also apply with respect to the olefin polymerisation process according to the present invention.

The olefin polymerisation (which includes homo- and copolymerisations) method of the present invention is preferably carried out in the liquid phase (i.e. known as "slurry phase" or "slurry process") or in the gas phase or in the case of propylene polymerisation also in a bulk process in the presence of the supported catalyst system according to the invention. Combinations of different processes are also applicable.

Liquid Phase

In a slurry process (liquid phase), the liquid comprises the olefin, either propylene or ethylene, and where required one or more alpha-olefinic comonomers comprising from 2 to 10 carbon atoms, in an inert diluent. The comonomer may be selected from one or more alpha-olefins, such as ethylene (when polymerising propylene), 1-butene, 1-hexene, 4-methyl 1-pentene, 1-heptene and 1-octene. Preferably, if copolymerising propylene, the comonomer selected is ethylene. Preferably, if copolymerising ethylene, the comonomer is selected from one or more alpha-olefinic comonomers comprising from 3 to 10 carbon atoms, preferably 1-hexene. In either case, the inert diluent is preferably isobutane.

The polymerisation process for ethylene is typically carried out at a polymerisation temperature of from 80 to 110° C. and under a pressure of at least 20 bars. Preferably, the temperature ranges from 85 to 110° C. and the pressure is at least 40 bars, more preferably from 40 to 42 bars.

The polymerisation process for propylene is typically carried out at a polymerisation temperature of from 60 to 110° C. and under a pressure of at least 20 bars. Preferably, the temperature ranges from 65 to 110° C., preferably 70° to 100° C., more preferably 65 to 78° C. and the pressure is at least 40 bars, more preferably from 40 to 42 bars.

Other compounds such as a metal alkyl or hydrogen may be introduced into the polymerisation reaction to regulate activity and polymer properties such as melt flow index. In one preferred process of the present invention, the polymerisation or copolymerisation process is carried out in a slurry reactor, e.g. in a liquid-full loop reactor.

Gas Phase

The catalyst system of the invention is also particularly suited for gas phase polymerisations of olefins. Gas phase polymerisations can be performed in one or more fluidised bed or agitated bed reactors. The gas phase comprises the olefin to be polymerised, preferably ethylene or propylene, if required one or more alpha-olefinic comonomers comprising 2 to 10 carbon atoms, such as ethylene (when polymerising propylene), 1-butene, 1-hexene, 4-methyl-1-pentene, 1-octene or mixtures thereof and an inert gas such as nitrogen. Preferably, if polymerising propylene, the comonomer selected is ethylene. Preferably, if polymerising ethylene, the comonomer selected is 1-hexene. In either case, optionally a metal alkyl can also be injected in the polymerisation medium as well as one or more other reaction-controlling agents, for example, hydrogen. Reactor temperature can be adjusted to a temperature of from 60, 65, 70, 80, 85, 90 or 95° C. up to 100, 110, 112 or 115° C. Optionally a hydrocarbon diluent such as pentane, isopentane, hexane, isohexane, cyclohexane or mixtures thereof can be used if the gas phase unit is run in the so-called condensing or super-condensing mode.

Bulk

Polypropylene can also be obtained by using the metallocene catalyst system of the invention by polymerizing propylene in a bulk process, e.g. in a loop reactor (Spheripole) or a continuous stirred-tank reactor (CSTR), or in a Spherizone® process i.e. a multi-zone circulating reactor. Combinations of the above types of processes are also applicable e.g. continuous stirred-tank reactor (CSTR) under bulk conditions, followed by a gas phase reactor. As for the slurry and gas phase process, where required, the propylene can be copolymerized with one or more alpha-olefinic comonomers comprising from 2 to 10 carbon atoms, preferably ethylene.

Increased Activity

Surprisingly, it was found that the supported catalyst system according to the invention greatly improves the catalytic activity of metallocene catalyst systems.

In one embodiment, it was found that the catalytic activity of a metallocene catalyst system increased by over 40% by using the titanated support according to the invention in ethylene polymerisations, rather than a non-titanated support. The activity of the catalyst system increased by over 60% when copolymerising ethylene with a comonomer. The activity of the catalyst system increased by over 35% when polymerising propylene.

Surprisingly, under industrial conditions e.g. in a double slurry loop reactor (Advanced Double Loop i.e. two slurry loop reactors connected in series), the activities observed for homopolymerization of olefin with the catalyst of the invention are higher than for copolymerization processes under the same conditions. 100% increase in activity was observed.

Polyolefin

The invention also covers the polyolefin obtainable using the supported catalyst system of the invention. When the catalyst system of the invention has a Ti content of 1 to 12 wt % based on the weight of the titanated silica-containing catalyst support, the polyolefin obtained therewith has an atomic molar ratio of Ti to the transition metal M i.e. Ti/M, wherein M is selected from one or more of zirconium, hafnium and vanadium, of 0.13 to 500. When the catalyst system of the invention has a Ti content of 1 to 10 wt % based on the weight of the titanated silica-containing catalyst support, the polyolefin obtained therewith preferably has a Ti/M atomic molar ratio of 1.3 to 420. The transition metal M indicates that the polyolefin was obtained in the presence of at least one metallocene. In addition, the Cl/Ti atomic molar ratio of the polyolefin should be less than 2.5. This indicates that the polyolefin was obtained in the absence of a Ziegler-Natta catalyst, since Ziegler-Natta catalysts include large amounts of Cl. The presence of Ti indicates the use a Ti containing compound to boost catalytic activity of the metallocene.

Thus in another embodiment, the invention covers a polyolefin having a Ti/M atomic molar ratio of 0.13 to 500, preferably 1.3 to 420, wherein M is selected from one or more of zirconium, hafnium and vanadium, and preferably a Cl/Ti atomic molar ratio of less than 2.5.

The content of Ti and M of the polyolefin are measured by inductively coupled plasma atomic emission spectroscopy (ICP-AES) as is known in the art. The content of Cl is measured by XRF as is known in the art. Note that the measurements are made on the polyolefin obtained from the reactor (the fluff), prior to additivation and extrusion.

Such a Ti content allows the formation of a polyolefin using far less catalyst, due to the increased activity of the supported catalyst system in the presence of Ti. As a result, the polyolefin has a lower catalytic residue, which in turn improves its use in terms of health and safety (less catalytic residue to potentially migrate to the surface). Due to the increased activity, the polyolefins also have lower amounts of volatiles, because monomer and optional comonomer are more efficiently incorporated.

Thus the polyolefin obtained using the supported catalyst system of the invention is particular suitable for applications requiring good organoleptic properties e.g. for food and drink packaging.

When polymerising ethylene, the polyethylene obtained with the catalyst system of this invention can have a molecular weight distribution (MWD) that is represented by Mw/Mn (weight average molecular weight/number average molecular weight, measured by GPC analysis) of typically from 2 to 10, more typically of 3 to 8, a density measured according to ISO 1183 typically from 0.920 up to 0.970 g/cm$^3$ and a melt flow index (MI$_2$) measured according to ISO 1133, condition D, at 190° C. and 2.16 kg typically from 0.1 to 50 g/10 min, preferably 0.1 to 30 g/10 min.

When polymerising propylene, the polypropylene obtained with the catalyst system of this invention can have a density measured according to ISO 1183 typically from 0.920 up to 0.970 g/cm$^3$ and a melt flow index (MI$_2$) measured according to ISO 1133, condition L, at 230° C. and 2.16 kg, in the range from 0.05 g/10 min to 2000 g/10 min. The polyolefins obtained using the catalyst system of the invention can be used in any application known to the person skilled in the art.

The following Examples are given to illustrate the invention without limiting its scope.

EXAMPLES

Example 1

Ethylene Polymerisation

Figure 2:
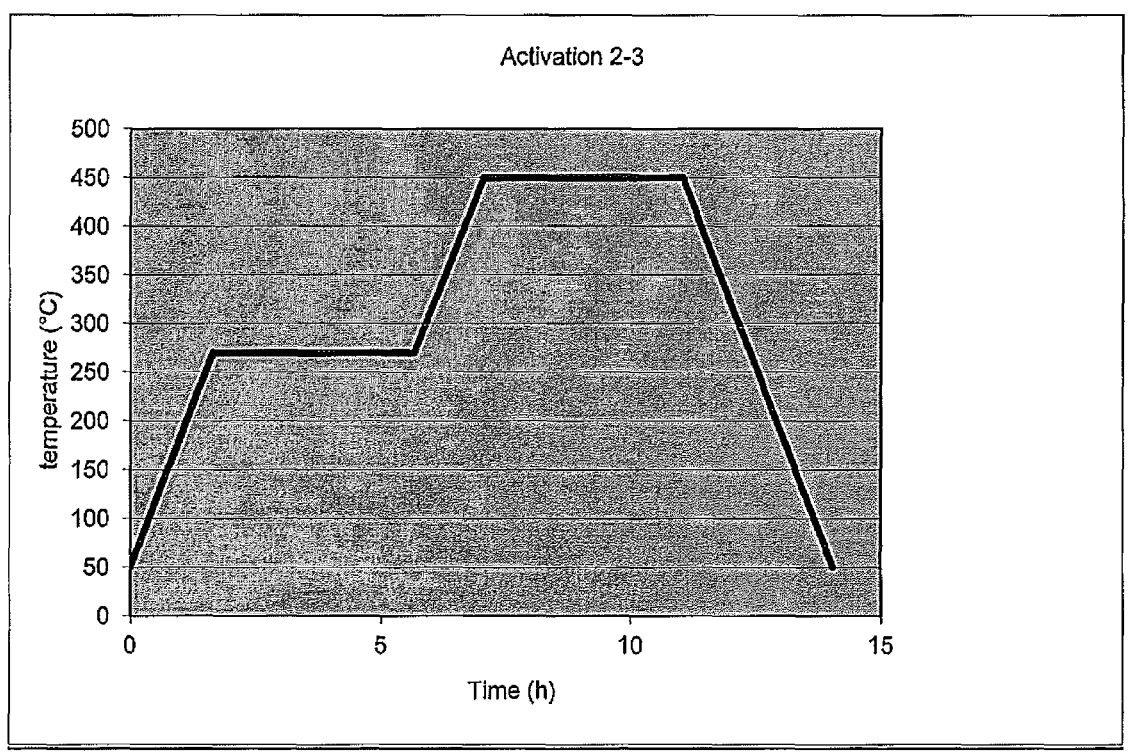
FIG. 2 represents the activation temperature profile of the metallocene catalyst system according to the invention.
Figure 3:
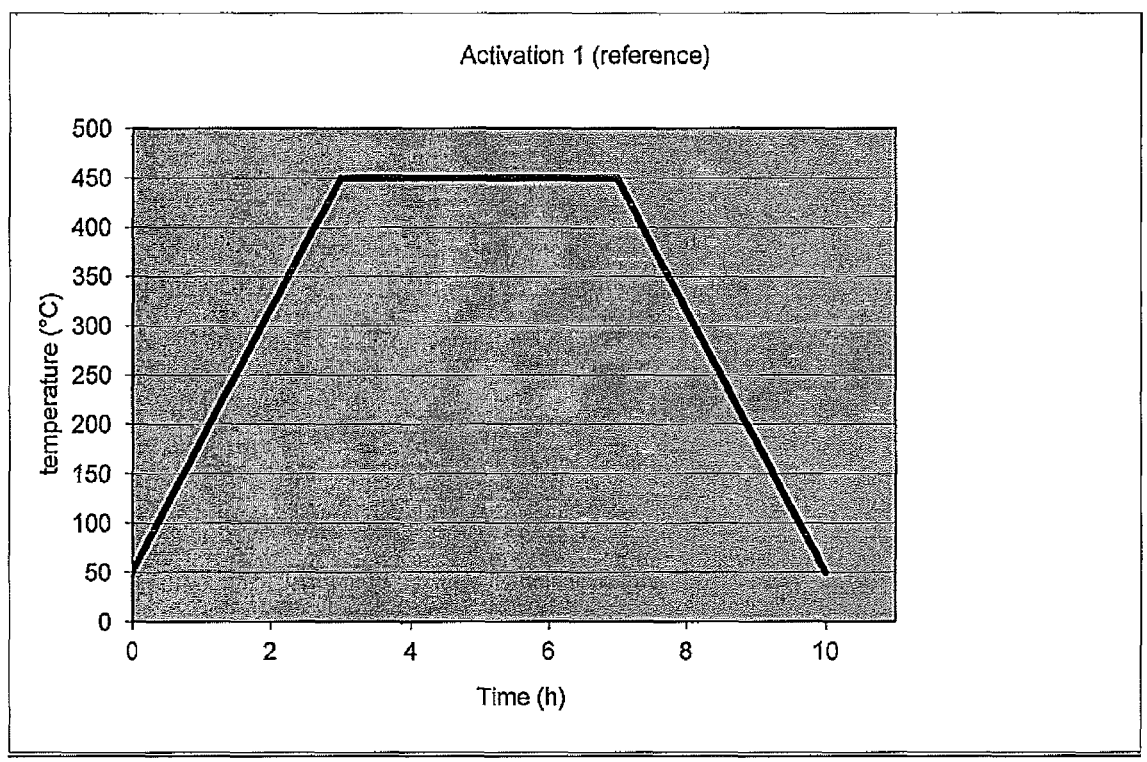
FIG. 3 represents the activation temperature profile of the metallocene catalyst system without Titanium.

Supported Catalyst Systems "Catalyst Z1" and "Catalyst Z2" According to the Invention
1. Support Modification Silica support was heated under a nitrogen flow with the desired amount of Ti precursor i.e. TYSOR® a mixture of 80 wt % isopropoxide titane and 20 wt % tertiary butoxide titane at 270° C., then dried at 450° C. (as shown in FIG. 1: "Catalyst Z1" having 2 wt % Ti and "Catalyst Z2" having 4 wt % Ti based on the weight of the supported catalyst system). The activation profile for both catalysts is shown in FIG. 2.

2. MAO Treatment

MAO was mixed in toluene with the modified support at 110° C. After filtration, the recovered powder was washed and dried overnight to obtain the MAO- and Ti-modified support.

3. Metallocene Treatment

The metallocene ethylene-bis(4,5,6,7-tetrahydro-1-indenyl)zirconium dichloride was stirred with the MAO- and Ti-modified support at room temperature for 2 hours. After filtration, the recovered powder was washed and dried overnight to obtain the supported catalyst system according to the invention.

The obtained supported catalyst systems had:

"Catalyst Z1" a Ti content of 1.5 wt % Ti and a Ti/Zr atomic molar ratio of 3.07.

"Catalyst Z2" a Ti content of 3 wt % Ti and a Ti/Zr atomic molar ratio of 6.14.

The content of Cl was below the detection limit, only trace amounts present.

The content of Ti, Zr and Cl were measured using XRF.

FIG. 5 shows how the Ti is deposited predominantly on the surface of the particles.

Supported Catalyst System "Catalyst C1" (Comparative)
1. Support Modification

Silica support was dried under a nitrogen flow at 450° C.

2. MAO Treatment

MAO was mixed in toluene with the modified support at 110° C. After filtration, the recovered powder was washed and dried overnight to obtain the MAO-modified support.

3. Metallocene Treatment

The metallocene ethylene-bis(4,5,6,7-tetrahydro-1-indenyl)zirconium dichloride was stirred with the MAO-modified support at room temperature for 2 hours. After filtration, the recovered powder was washed and dried overnight to obtain the supported catalyst system.

Ethylene Polymerisations

Polymerisations of ethylene were carried out with "Catalysts Z1 and Z2" and compared with polymerisations of ethylene using "Catalyst C1" under the same reaction conditions.

The catalyst system was injected in a 130 mL reactor containing 75 mL of isobutane under an ethylene pressure of 23.8 bars at 85° C. for homopolymerisation.

For the copolymerisation runs the same conditions were used with the addition of 2.6 wt % of hexene.

FIG. 1 shows the comparison of the catalytic activity between the different runs, "Catalyst C1" having no titanium content, being the reference. As presented, the titanation of the support according to the invention provides increased activities. The presence of only 1.5 wt % and 3 wt % of Ti on the supported catalyst system already increases the catalytic activity by about 40% in the case of ethylene polymerisations.

The polyethylene obtained with "Catalyst Z1" had a Ti/Zr atomic molar ratio of 3.07. The polyethylene obtained with "Catalyst Z2" had a Ti/Zr atomic molar ratio of 6.14.

The content of Cl was below the detection limit as measured by XRF, only trace amounts present. Si content was measured using XRF as well.

The content of Ti and Zr were measured using ICP-AES.

Catalytic residues were measured as follows:

|  | PE using CATALYST Z1 (invention) | PE using CATALYST C1 (comparative) |
| --- | --- | --- |
| Si/ppm | 287.8 | 403 |
| Ti/ppm | 1.85 | No Ti |
| Zr/ppm | 0.78 | 1.1 |

Thus the catalytic residue in the polyethylene according to the invention using "Catalyst Z1" was less than the polyethylene obtained using "Catalyst C1" indicating that titanium deposited on the surface of the catalyst grain greatly increased the catalytic activity of the metallocene.

Polymerisations of ethylene on a ADL (Advanced Double Loop i.e. two slurry loop reactors connected in series) process were carried out with "Catalyst Z1" and compared with results using "Catalyst C1". "Catalyst Z1" showed 100% higher catalyst activity in comparison to "Catalyst C1".

Example 2

Propylene Polymerisation

Figure 4:
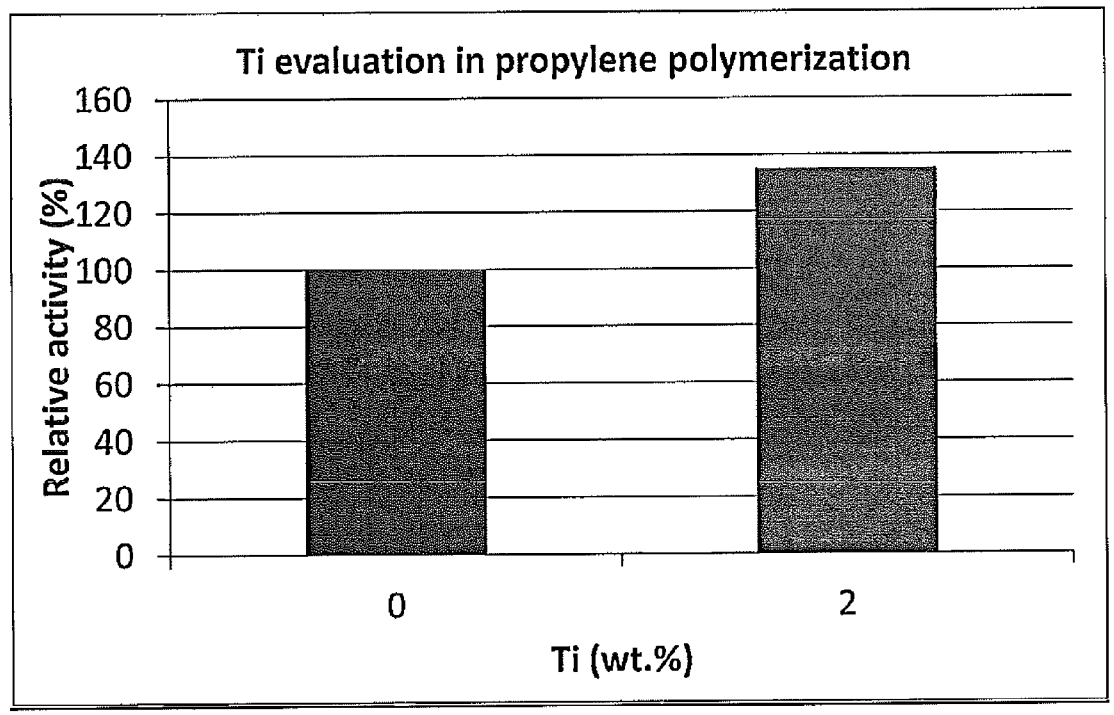
FIG. 4 represents a comparison of the catalytic activities of the metallocene catalyst system comprising 2 wt % of Ti added according to the invention with the catalytic activity of the metallocene catalyst system without titanium for propylene polymerisations.

Supported Catalyst System "Catalyst Y" According to the Invention
1. Support Modification
Silica support was heated under a nitrogen flow with the desired amount (as shown in FIG. 4: "Catalyst Y" had 2 wt % of Ti based on the weight of the supported catalyst system) of Ti precursor, i.e. TYSOR® a mixture of 80 wt % isopropoxide titane and 20 wt % tertiary butoxide titane, at 270° C., then dried at 450° C. The activation profile is shown in FIG. 2.
2. MAO Treatment
MAO was mixed in toluene with the modified support at 110° C. After filtration, the recovered powder was washed and dried overnight to obtain the MAO- and Ti-modified support.
3. Metallocene Treatment
The metallocene dimethylsilylene bis(2-methyl-4-phenyl-inden-1-yl)zirconium dichloride was stirred with the MAO- and Ti-modified support at room temperature for 2 hours. After filtration, the recovered powder was washed and dried overnight to obtain the supported catalyst system according to the invention. The catalyst system was slurried in oil.

"Catalyst Y" had a Ti content of 1.5 wt % Ti and a Ti/Zr atomic molar ratio of 18.

The content of Cl was below the detection limit, only trace amounts present.

The content of Ti, Zr and Cl were measured using XRF.

Supported Catalyst System "Catalyst C2" (Comparative)
1. Support Modification
Silica support was dried under a nitrogen flow at 450° C.
2. MAO Treatment
MAO was mixed in toluene with the modified support at 110° C. After filtration, the recovered powder was washed and dried overnight to obtain the MAO-modified support.
3. Metallocene Treatment
The metallocene dimethylsilylene bis(2-methyl-4-phenyl-inden-1-yl)zirconium dichloride was stirred with the MAO-modified support at room temperature for 2 hours. After filtration, the recovered powder was washed and dried overnight to obtain the supported catalyst system. The catalyst system was slurried in oil.

Propylene Polymerisations

Polymerisations of propylene were carried out with "Catalyst Y" according to the invention and compared with polymerisations of propylene using "Catalyst C2" under the same reaction conditions.

The catalyst system was injected in a 8 L reactor containing 4.5 L of propylene and 1.5 NL hydrogen at 40° C. for prepolymerisation. After catalyst injection, the temperature was raised to 70° C.

For the copolymerisation runs the same conditions were used with the addition of 2.6 wt % of hexene.

FIG. 4 shows the comparison of the catalytic activity between the different runs, "Catalyst C2" having no titanium content, being the reference. As presented, the titanation of the support according to the invention provides increased activities. The presence of only 1.5 wt % of Ti on the supported catalyst system already increases the catalytic activity by about 35% in the case of propylene polymerisations (FIG. 4).

The polypropylene obtained with "Catalyst Y" had a Ti/Zr atomic molar ratio of 18. The content of Cl was below the detection limit as measured by XRF, only trace amounts present.

The content of Ti and Zr were measured using ICP-AES.

Thus the catalytic residue in the polypropylene according to the invention was less than the polypropylene obtained using "Catalyst C2".

The invention claimed is:
1. A process for preparing a supported catalyst system comprising:
   a. titanating a silica-containing catalyst support having a specific surface area of from 150 m²/g to 800 m²/g with at least one vapourised titanium compound to form a titanated silica-containing catalyst support having at least 0.1 wt % of Ti based on a weight of the titanated silica-containing catalyst support;
   b. treating the titanated silica-containing catalyst support with a catalyst activating agent; and
   c. treating the titanated silica-containing catalyst support with at least one metallocene during or after step (b);
   wherein the at least one vapourised titanium compound is selected from a group consisting of tetraalkoxides of titanium having the general formula Ti(OR')$_4$, wherein each R is the same or different and is an alkyl group having from 3 to 5 carbon atoms, a cycloalkyl group having from 3 to 5 carbon atoms, or a mixture thereof.

2. The process according to claim 1, wherein the titanated silica-containing catalyst support has 0.1 to 60 wt % of Ti based on the weight of the titanated silica-containing catalyst support.

3. The process according to claim 1, wherein the at least one metallocene is a selected from formula (I) or (II):

(I)

(II)

wherein the at least one metallocene according to formula (I) is a non-bridged metallocene and the at least one metallocene according to formula (II) is a bridged metallocene;
wherein said at least one metallocene according to formula (I) or (II) has two Ar bound to M which are the same or different from each other; wherein each Ar is an aromatic ring, group or moiety independently selected from a group consisting of cyclopentadienyl, indenyl, tetrahydroindenyl or fluorenyl optionally substituted with one or more substituents each independently selected from the group consisting of hydrogen, halogen and a hydrocarbyl having 1 to 20 carbon atoms and wherein said hydrocarbyl optionally contains one or more atoms selected from the group comprising B, Si, S, O, F and P; wherein M is a transition metal selected from a group consisting of titanium, zirconium, hafnium and vanadium; wherein each Q is independently selected from a group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F and P; and wherein R" is a divalent group or moiety bridging the two Ar groups and is selected from a group consisting of a $C_1$-$C_{20}$ alkylene, a germanium, a silicon, a siloxane, an alkylphosphine and an amine, and wherein said R" is optionally substituted with one or more substituents each independently selected from a group comprising a hydrocarbyl having 1 to 20 carbon atoms and wherein said hydrocarbyl optionally contains one or more atoms selected from a group comprising B, Si, S, O, F and P.

4. The process according to claim 3, wherein each Ar is selected independently from an indenyl or a tetrahydroindenyl.

5. The process according to claim 1, wherein the catalyst activating agent is alumoxane, wherein the alumoxane is selected from:
R—(Al(R)—O)$_x$—AlR$_2$ (III) for oligomeric alumoxane or linear alumoxane; or
(—Al(R)—O—)$_y$ (IV) for oligomeric alumoxane or cyclic alumoxane;
wherein x is 1-40; wherein y is 3-40; and wherein each R is independently selected from a $C_1$-$C_8$ alkyl.

6. The process according to claim 1, wherein the titanated silica-containing catalyst support has an atomic molar ratio Ti/M of 0.13 to 500, wherein M is a transition metal selected from one or more of zirconium, hafnium and vanadium.

7. The process according to claim 1, wherein the titanated silica-containing catalyst support has 0.1 to 12 wt % of Ti based on the weight of the titanated silica-containing catalyst support.

8. The process according to claim 1, wherein the titanium compound is present predominately on a surface of the titanated silica-containing catalyst support.

9. A process for preparing a supported catalyst system comprising:
a. titanating a silica-containing catalyst support having a specific surface area of from 150 m²/g to 800 m²/g with at least one vapourised titanium compound to form a titanated silica-containing catalyst support having at least 0.1 wt % of Ti based on a weight of the titanated silica-containing catalyst support;
b. treating the titanated silica-containing catalyst support with a catalyst activating agent; and
c. treating the titanated silica-containing catalyst support with at least one metallocene during or after step (b);
wherein the at least one vapourised titanium compound is selected from Ti(OC$_4$H$_9$)$_4$, Ti(OC$_3$H$_7$)$_4$, or a mixture thereof.

10. The process according to claim 9, wherein the at least one vapourised titanium compound is a mixture of Ti(OC$_4$H$_9$)$_4$ and Ti(OC$_3$H$_7$)$_4$, having a weight ratio of 20:80 of Ti(OC$_4$H$_9$)$_4$ to Ti(OC$_3$H$_7$)$_4$.

11. A process for preparing a supported catalyst system comprising:
a. titanating a silica-containing catalyst support having a specific surface area of from 150 m²/g to 800 m²/g with at least one vapourised titanium compound of the general formula selected from R$_n$Ti(OR')$_m$, and (RO)$_n$Ti(OR')$_m$, wherein R and R' are the same or different and are selected from hydrocarbyl groups containing from 1 to 12 carbons or halogens, wherein n is 0 to 4, wherein m is 0 to 4, and wherein m+n equals 4, to form a titanated silica-containing catalyst support having at least 0.1 wt % of Ti based on a weight of the titanated silica-containing catalyst support;
b. treating the titanated silica-containing catalyst support with a catalyst activating agent; and
c. treating the titanated silica-containing catalyst support with at least one metallocene during or after step (b);
wherein the titanated silica-containing catalyst support has an atomic molar ratio Cl/Ti of less than 2.5.

12. A process for preparing a supported catalyst system comprising:
a. titanating a silica-containing catalyst support having a specific surface area of from 150 m²/g to 800 m²/g with at least one vapourised titanium compound of the general formula selected from R$_n$Ti(OR')$_m$, and (RO)$_n$Ti(OR')$_m$, wherein R and R' are the same or different and are selected from hydrocarbyl groups containing from 1 to 12 carbons or halogens, wherein n is 0 to 4, wherein m is 0 to 4, and wherein m+n equals 4, to form a titanated silica-containing catalyst support having at least 0.1 wt % of Ti based on a weight of the titanated silica-containing catalyst support;
b. treating the titanated silica-containing catalyst support with a catalyst activating agent; and
c. treating the titanated silica-containing catalyst support with at least one metallocene during or after step (b);
wherein titanating the silica-containing catalyst support is performed after or during drying of the silica-containing catalyst support.

13. A process for preparing a supported catalyst system comprising:
a. titanating a silica-containing catalyst support having a specific surface area of from 150 m²/g to 800 m²/g with at least one vapourised titanium compound of the general formula selected from R$_n$Ti(OR')$_m$, and (RO)$_n$Ti(OR')$_m$, wherein R and R' are the same or different and are selected from hydrocarbyl groups containing from 1 to 12 carbons or halogens, wherein n is 0 to 4, wherein m is 0 to 4, and wherein m+n equals 4, to form a titanated silica-containing catalyst support having at least 0.1 wt % of Ti based on a weight of the titanated silica-containing catalyst support;
b. treating the titanated silica-containing catalyst support with a catalyst activating agent; and
c. treating the titanated silica-containing catalyst support with at least one metallocene during or after step (b);
wherein titanating the silica-containing catalyst support is performed at a temperature of at least 220° C.

14. A process for preparing a supported catalyst system comprising:
a. titanating a silica-containing catalyst support having a specific surface area of from 150 m²/g to 800 m²/g with at least one vapourised titanium compound of the general formula selected from $R_n Ti(OR')_m$, and $(RO)_n Ti(OR')_m$, wherein R and R' are the same or different and are selected from hydrocarbyl groups containing from 1 to 12 carbons or halogens, wherein n is 0 to 4, wherein m is 0 to 4, and wherein m+n equals 4, to form a titanated silica-containing catalyst support having at least 0.1 wt % of Ti based on a weight of the titanated silica-containing catalyst support;
b. treating the titanated silica-containing catalyst support with a catalyst activating agent; and
c. treating the titanated silica-containing catalyst support with at least one metallocene during or after step (b);
wherein, after titanating the silica-containing catalyst support, the titanated silica-containing catalyst support is dried at a temperature ranging from 350° C. to 800° C.

15. A process for preparing a supported catalyst system comprising:
a. titanating a silica-containing catalyst support having a specific surface area of from 150 m²/g to 800 m²/g with at least one vapourised titanium compound of the general formula selected from $R_n Ti(OR')_m$, and $(RO)_n Ti(OR')_m$, wherein R and R' are the same or different and are selected from hydrocarbyl groups containing from 1 to 12 carbons or halogens, wherein n is 0 to 4, wherein m is 0 to 4, and wherein m+n equals 4, to form a titanated silica-containing catalyst support having at least 0.1 wt % of Ti based on a weight of the titanated silica-containing catalyst support;
b. treating the titanated silica-containing catalyst support with a catalyst activating agent; and
c. treating the titanated silica-containing catalyst support with at least one metallocene during or after step (b);
wherein the titanating of the silica-containing catalyst support is performed by introducing the at least one vapourised titanium compound into a stream of a dry and inert non-oxidizing gas.

16. The process according to claim 15, wherein the titanating of the silica-containing catalyst support is performed for a period of 0.5 hours to 2 hours.

17. A process for preparing a supported catalyst system comprising:
a. titanating a silica-containing catalyst support having a specific surface area of from 150 m²/g to 800 m²/g with at least one vapourised titanium compound of the general formula selected from $R_n Ti(OR')_m$, and $(RO)_n Ti(OR')_m$, wherein R and R' are the same or different and are selected from hydrocarbyl groups containing from 1 to 12 carbons or halogens, wherein n is 0 to 4, wherein m is 0 to 4, and wherein m+n equals 4, to form a titanated silica-containing catalyst support having at least 0.1 wt % of Ti based on a weight of the titanated silica-containing catalyst support;
b. treating the titanated silica-containing catalyst support with a catalyst activating agent; and
c. treating the titanated silica-containing catalyst support with at least one metallocene during or after step (b);
wherein a ratio of the specific surface area of the silica-containing catalyst support to a titanium content of the titanated silica-containing catalyst support ranges from 5,000 to 20,000 m²/g Ti.

18. A process for preparing a supported catalyst system comprising:
a. titanating a silica-containing catalyst support having a specific surface area of from 150 m²/g to 800 m²/g with at least one vapourised titanium compound of the general formula selected from $R_n Ti(OR')_m$, and $(RO)_n Ti(OR')_m$, wherein R and R' are the same or different and are selected from hydrocarbyl groups containing from 1 to 12 carbons or halogens, wherein n is 0 to 4, wherein m is 0 to 4, and wherein m+n equals 4, to form a titanated silica-containing catalyst support having at least 0.1 wt % of Ti based on a weight of the titanated silica-containing catalyst support;
b. treating the titanated silica-containing catalyst support with a catalyst activating agent; and
c. treating the titanated silica-containing catalyst support with at least one metallocene during or after step (b);
wherein, after titanating the silica-containing catalyst support, the titanated silica-containing catalyst support is flushed under a gas stream for a period of 0.75 hours to 2 hours.

* * * * *